US010264661B2

(12) United States Patent
Fork et al.

(10) Patent No.: US 10,264,661 B2
(45) Date of Patent: Apr. 16, 2019

(54) TARGET STRUCTURE FOR ENHANCED ELECTRON SCREENING

(71) Applicants: Google Inc., Mountain View, CA (US); University of Maryland, College Park, College Park, MD (US)

(72) Inventors: David K. Fork, Mountain View, CA (US); Jeremy N. Munday, North Bethesda, MD (US); Tarun Narayan, Washington, DC (US); Joseph B. Murray, Laurel, MD (US)

(73) Assignees: Google Inc., Mountain View, CA (US); University of Maryland, College Park, College Park, MD (US)

( * ) Notice: Subject to any disclaimer, the term of this patent is extended or adjusted under 35 U.S.C. 154(b) by 79 days.

(21) Appl. No.: 15/668,499

(22) Filed: Aug. 3, 2017

(65) Prior Publication Data

US 2019/0045617 A1    Feb. 7, 2019

(51) Int. Cl.
*G21B 3/00* (2006.01)
*G21B 1/00* (2006.01)
(Continued)

(52) U.S. Cl.
CPC .............. *H05H 1/03* (2013.01); *G21B 1/01* (2013.01); *G21B 3/006* (2013.01); *H01J 1/3048* (2013.01); *H01J 9/025* (2013.01); *H05H 1/0012* (2013.01)

(58) Field of Classification Search
USPC ...... 250/492.3, 526; 376/100, 105, 123, 156
See application file for complete search history.

(56) References Cited

U.S. PATENT DOCUMENTS 3,031,399 A * 4/1962 Warnecke ............... H05H 1/18
                                                        313/161
3,914,766 A * 10/1975 Moore .................... H01Q 3/44
                                                        315/39
(Continued)

OTHER PUBLICATIONS

Assenbaum, H.J., et al., entitled "Effects of Electron Screening on Low-Energy Fusion Cross Sections", Z. Phys. A—Atomic Nuclei 327, 461-468 (1987).

*Primary Examiner* — Bernard E Souw
(74) *Attorney, Agent, or Firm* — Bever, Hoffman & Harms, LLP

(57) ABSTRACT

Enhanced Coulomb repulsion (electron) screening around light element nuclei is achieved by way of utilizing target structures (e.g., nanoparticles) that undergo plasmon oscillation when subjected to electromagnetic (EM) radiation, whereby transient high density electron clouds are produced in localized regions of the target structures during each plasmon oscillation cycle. Each target structure includes an integral body composed of an electrically conductive material that contains light element atoms (e.g., metal hydrides, metal deuterides or metal tritides). The integral body is also configured (i.e., shaped/sized) to undergo plasmon oscillations in response to the applied EM radiation such that the transient high density electron clouds are formed during each plasmon oscillation cycle, whereby brief but significantly elevated charge density variations are generated around light element (e.g., deuterium) atoms located in the localized regions, thereby enhancing Coulomb repulsion screening to enhance nuclear fusion reaction rates. Various target structure compositions and configurations are disclosed.

20 Claims, 10 Drawing Sheets

(51) Int. Cl.
*H05H 1/00* (2006.01)
*H05H 1/24* (2006.01)
*H05H 1/03* (2006.01)
*G21B 1/01* (2006.01)
*H01J 1/304* (2006.01)
*H01J 9/02* (2006.01)

(56) References Cited

U.S. PATENT DOCUMENTS

2009/0122940 A1\* 5/2009 Breed ................... G21B 3/00
    376/100
2012/0191163 A1\* 7/2012 Yelin ................... B82Y 5/00
    607/92
2014/0126679 A1\* 5/2014 Egely ................... G21B 3/002
    376/156

\* cited by examiner ure TARGET STRUCTURE FOR ENHANCED
ELECTRON SCREENING

FIELD OF THE INVENTION

This invention relates to nuclear fusion, and more particularly to enhancing electron screening effects around light element atoms to enhance nuclear fusion reaction rates.

BACKGROUND OF THE INVENTION

Scattering experiments are the foundation of our understanding of nuclear reactions, including what is known about light element fusion cross sections. FIG. 14 is a schematic of an exemplary scattering experiment in a metallic (i.e., deuterated Tantalum (Ta) host lattice) that is described by F. Raiola et al. in "Enhanced electron screening in d(d, p)t for deuterated Ta," Eur. Phys. J. A 13, 377-382 (2002). In the depicted experiment, a deuteron ion beam both (1) deuterates the metal target and (2) supplies the energetic particles for the measurement of fusion cross section. Silicon detectors count the energetic protons that are emitted from the target from the D(d,p)T reaction.

Colliding together two positively charged nuclei in a colliding beam experiment is the canonical way to measure the bare ion cross section $\sigma_b$. Colliding an ion with a nucleus in a condensed matter target in the manner depicted in FIG. 14 is the canonical way to measure the enhancement of fusion reaction cross sections that is routinely observed in atoms, molecules, and in particular, in metals, where there is an electron cloud present that can screen the Coulomb repulsion between the two positively charged nuclei. This enhanced cross section $\sigma_s$ relative to the bare ion cross section is attributed to a reduction in the Coulomb barrier via electron screening and is described in terms of an electron screening potential energy $U_e$.

FIG. 15 is a graph depicting cross sections for D(d,p)T fusion with and without 150 eV screening, and the associated enhancement factor. Screened cross section $\sigma_{scr}$ has traditionally been modeled by the expression $$\sigma_{scr} = \frac{1}{\sqrt{E(E+U_e)}} S(E) \exp\left(-\sqrt{\frac{E_G}{(E+U_e)}}\right)$$

where E is the center-of-mass energy, $U_e$, is the screening energy, S(E) is the astrophysical factor, and $E_G$ is the Gamow energy (0.986 MeV for DD fusion). The bare nuclear fusion cross section is modeled with $U_e$=0; in metals a typical empirical screening energy is 150 eV. The screening potential energy in $D_2$ molecules is measured to be about 25±5 eV, a number that is in reasonably close agreement with theory. In contrast, in metals, the screening potential energy, and hence the enhancement in the fusion cross section is often reported to be more than an order of magnitude higher. For example, Jirohta Kasagi et al. reported a screening energy of 600 eV in PdO (see Journal of the Physical Society of Japan, Vol. 71, No. 12, December, 2002, pp. 2881-2885). More recently, K. Czerski et al. performed more accurate measurements of the DD fusion cross sections in zirconium hydride that suggest that the effect is a combination of both electron screening and resonance effects (see EPL, 113 (2016) 22001). Models of nuclear fusion cross section enhancement at low energy in condensed matter are still evolving, and it is expected that more accurate models than the one above based on screening energy will arise. This will however not alter the firmly established connection between electron density and the reduction in Coulomb repulsion by electron screening that gives rise to the enhanced rate of nuclear fusion.

A problem with the conventional electron screening techniques utilized in the study above is that they use static electron charge densities, which limit the density levels and hence electron screening effects applied to the light element atoms. Stated differently, when a solid or liquid material is in its equilibrium state, the electron distribution is unchanging and hence the electron charge density is limited to what is intrinsic to that material's electronic structure.

What is needed is an improved technique for generating electron screening effects around light elements that circumvents the inherent limitations of conventional (static charge density) electron screening techniques. In particular, what is needed is a way to increase electron charge density around light element atoms to levels greater than those achievable using conventional (static charge density) electron screening techniques.

SUMMARY OF THE INVENTION

The present invention provides target structures that facilitate achieving enhanced electron screening (Coulomb repulsion) effects around light element atoms when subjected to electromagnetic (EM) radiation by way of being configured to undergo plasmon oscillations in response to the EM radiation in a way that produces transient high density electron clouds in localized regions of the target structures, thereby generating transient elevated charge densities around light element atoms located in these localized regions at charge density levels that cannot be achieved using conventional (static charge density) electron screening techniques. Each target structure includes an integral (i.e., single-piece, electrically isolated) body consisting essentially of an electrically conductive material (e.g., a metal hydride), having a surface bounded by dielectric material (e.g., vacuum, a gaseous dielectric such as air, a solid dielectric material, or a liquid dielectric material), where the integral body is configured to undergo plasmon oscillations. In one embodiment, the integral body is configured (e.g., by way of its composition, size and shape) to undergo resonant plasmon oscillations at a corresponding plasmon resonance frequency wherein the amplitude of dynamic charge density variation goes through a maximum as a function of frequency in response to EM radiation produced at a corresponding (e.g., matching) excitation frequency. The induced plasmon oscillation causes free electrons to converge into bunches (clouds) in two or more localized regions of the target structure (e.g., at a first localized region during a first plasmon oscillation half-cycle, and then at a second localized region during a second plasmon oscillation half-cycle). At their peak convergence, the electron clouds produce brief but significantly elevated peak charge density levels in the localized regions that are at least 10% greater than at-rest charge density levels (i.e., in the absence of the applied EM radiation). These transient charge density level increases are utilized to enhance Coulomb repulsion screening around light element (e.g., deuterium) atoms that are disposed in the localized regions, and thus surrounded by the dense electron clouds. Although the peak charge density level is enhanced only in these relatively small localized regions of each target structure for very short time periods during each plasmon oscillation cycle, the peak charge density levels generate enhanced Coulomb repulsion screening that is substantially higher than those achievable by conventional (static charge density) screening techniques. The enhanced Coulomb repulsion screening increases the fusion cross section and reduces Coulomb repulsion between light element nuclei located in the electron clouds. Accordingly, subjecting the target structures to applied EM radiation to produce plasmon oscillations in the manner described above, the present invention achieves significantly increased fusion reaction rates in comparison to conventional approaches.

During reaction operations the target structures are typically positioned in a reaction chamber, and then EM radiation is directed toward the target structures. The EM radiation is generated or otherwise transmitted in a form that causes the target structures to undergo plasmon oscillation, thereby generating electron density variations of at least 10% around said light element atoms located in the localized regions of each integral body. The specific excitation frequency and other characteristics of the EM radiation are determined by several factors including characteristics of the electrically conductive material and the specific configuration (e.g., size and shape) of the target structures. These considerations set a practical range of excitation frequency EM radiation generally in the range of $10^{12}$ Hertz (Hz) and $10^{16}$ Hz. In one practical case, the EM radiation is generated at an excitation frequency in a range of 0.001 times the plasma frequency, below which the electrically conductive material from which the target structures are formed becomes too reflective, to 10 times a plasma frequency, above which the electrically conductive material from which the target structures are formed becomes too transmissive. For example, in metals, the plasma frequency is about 10 electron Volts, or equivalently, about $2.4 \times 10^{15}$ Hertz, leading to a range from $2.4 \times 10^{12}$ to $2.4 \times 10^{16}$ Hertz. In another embodiment, each target structure has one or more inherent plasmon resonance frequencies, and the EM radiation is generated at an excitation frequency that matches the plasmon resonance frequency). In another embodiment, the EM radiation is supplied at an intensity required to induce a carrier density oscillation amplitude in a range of 0.1 to fifty times the static conduction electron carrier density of the electrically conductive material used to form the target structures 100. According to a practical embodiment, the enhanced Coulomb repulsion screening of the present invention is generated by way of a system including an electromagnetic (EM) radiation subsystem and a target fixture configured to position one or more target structures such that the emitted EM radiation is simultaneously received by all of the target structures.

In a presently preferred embodiment, each target structure utilized in accordance with the present invention consists of a nanostructure that is configured to facilitate surface plasmon oscillations at extremely-high frequencies or greater (i.e., in the range of $10^{12}$ to $10^{16}$ Hz). As used herein, the term "nanostructure" refers to a single-piece structure (integral body) of any given shape (e.g., sphere, rod, prism, octahedron, disc, or cube) having nanometer-scale dimensions (i.e., minimum/maximum dimensions in the range of 1 nm to 1,000 nm) and a corresponding shape that, when formed using a suitable electrically conductive material and subjected to a suitable EM radiation, undergoes plasmon oscillations at frequencies on the order of $10^{12}$ Hz and higher.

In alternative embodiments, the target structures are solid structures formed entirely by an electrically conductive light element material, or formed as a multiple-layered structure. In an exemplary multiple-layered structure embodiment, the integral body structure is formed in a core-shell arrangement in which the electrically conductive material forms an outer shell surrounding a core comprising a different material (e.g., a dielectric material, a metal or vacuum). In a specific embodiment, the core-shell arrangement comprises a heteroepitaxial structure that is usefully engineered to induce pseudomorphic strain between the epitaxial layers in order to influence and beneficially modify the electronic and or chemical behavior of the layers. In a presently preferred embodiment, the inner core comprises a dielectric material or vacuum.

In the presently preferred embodiment, light element atoms make up at least 10 atomic percent of the electrically conductive material, which in alternative embodiments comprises a metal alloys with light elements (e.g., hydrides, deuterides or tritides of titanium, zirconium, niobium, vanadium, and palladium, as well as boron alloys of palladium and other metal-boron alloys), a conductive light element material (e.g., boron, beryllium, or lithium), or a hydride, deuteride, or tritide of a light element (e.g., lithium hydride).

In other embodiments, multiple nanostructures are mounted on a base structure comprising a material (e.g., dielectric) that is less electrically conductive than the electrically conductive material forming the separate integral bodies, or nanostructures include one or more antenna structures disposed (e.g., in a bowtie arrangement) adjacent to the integral bodies to enhance the amplitude of plasmon oscillations on the integrated bodies. As explained above, probability that two light elements will undergo nuclear fusion increases when a particular electron cloud configuration screens the Coulomb forces that repel two light element nuclei, thereby lowering the Coulomb barrier and increasing the rate of quantum tunneling to a separation distance (on the order of femtometers) wherein nuclear forces cause the light elements to fuse together. Because each nuclear fusion reaction event is predicated on probabilistic quantum tunneling through the Coulomb barrier separating two light element nuclei, and because the probability of tunneling increases with increased electron charge density which lowers the Coulomb barrier, nanostructures composed and configured in accordance with the present invention facilitate enhanced nuclear fusion rates by way of facilitating plasmon oscillations at optimal frequencies (i.e., having periods in the range of between about $10^{-12}$ sec, below which conducting materials become so highly reflective as to not efficiently undergo plasmon resonances, and about $10^{-20}$, which corresponds to the time required to complete a nuclear fusion event), and by way of providing light elements in the localized regions where the charge density variations are generated.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to nuclear fusion reactions, and the following description is presented to enable one of ordinary skill in the art to make and use the invention as provided in the context of a particular application and its requirements. As used herein, the phrase "integral body" is intended to describe a structure formed as a single-piece unit (e.g., deposited, grown, etched, molded or machined), as distinguished from two separately formed structures that are subsequently joined by way of, for example, adhesive or fastener. As used herein, the term "plasmon" as well as the phrase "plasmon oscillation" refer to any collective oscillation of conduction electrons in a conducting material (i.e., irrespective of the oscillation's association with a resonant oscillation), the phrase "resonant plasmon oscillation" refers to charge density oscillation at a related resonance frequency, and the phrase "plasmon resonance frequency" refers to the frequency at which a resonant plasmon oscillation occurs. Various modifications to the preferred embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
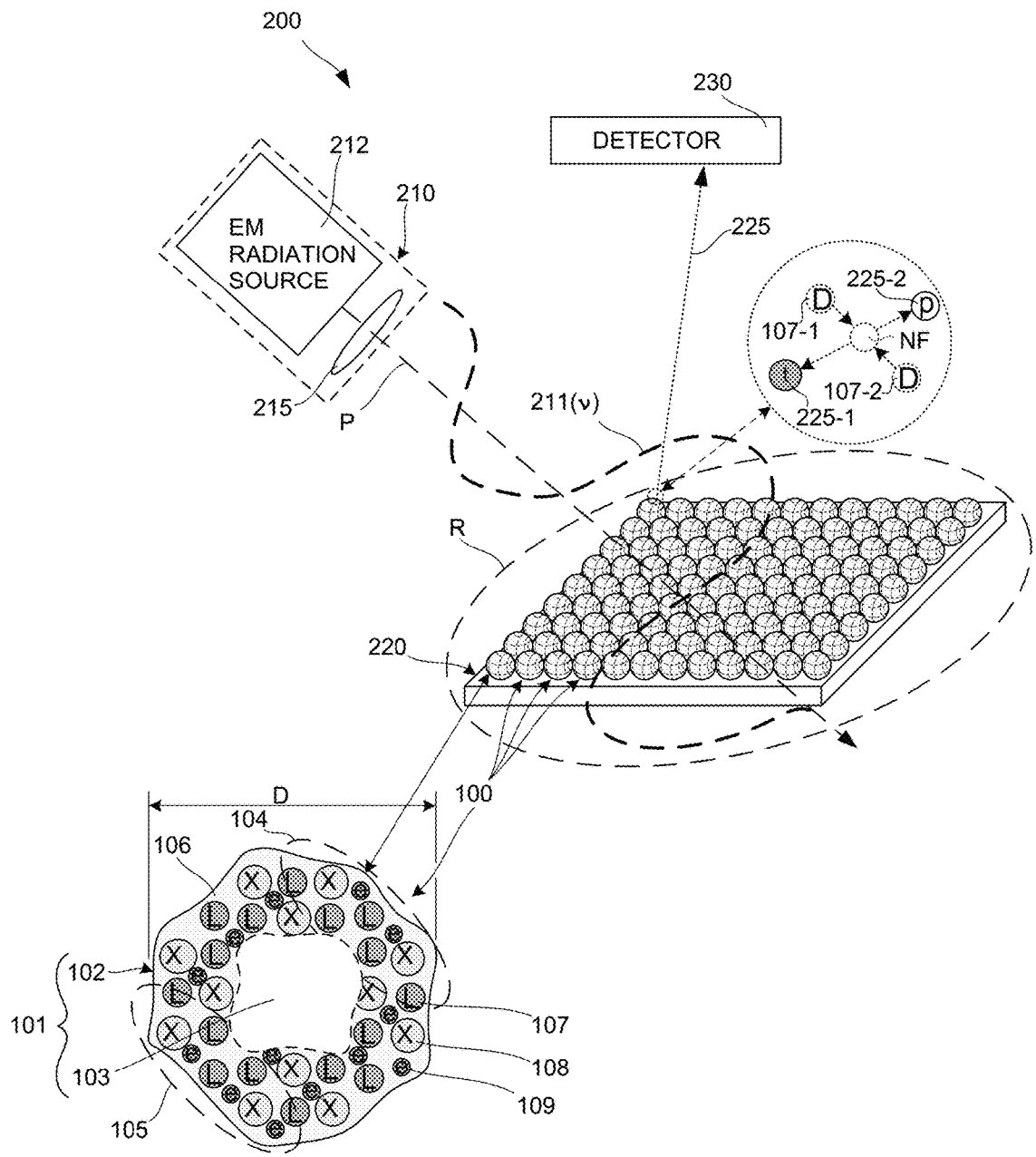
FIG. 1 is a top side perspective view depicting an exemplary system for achieving enhanced Coulomb repulsion screening according to a simplified embodiment of the present invention.

FIG. 1 depicts a simplified system 200 for enhancing electron screening effects around light element atoms according to a generalized embodiment of the present invention. System 200 generally includes an electromagnetic (EM) radiation subsystem 210, a target fixture 220 including multiple target structures 100, and an optional detector 230. Target fixture 220 is fixedly operably positioned in a reaction region R (e.g., a reaction chamber, not shown) relative to EM radiation subsystem 210 such that target structures 100 are located in emission path P and receive EM radiation 211. System 200 also includes support structures (not shown) that maintain EM radiation subsystem 210 and detector 230 in fixed positions relative to target fixture 220—such support structures and optional containment structures are known in the art and therefore omitted for brevity.

Referring to the upper left portion of FIG. 1, EM radiation subsystem 210 includes an EM radiation source (generation device) 212 and an optional optical subsystem 215 including one or more optical elements, wherein EM radiation source 212 and optical subsystem 215 are collectively configured to generate and emit EM radiation 211 a selected excitation frequency $\upsilon$ along emission path P. In a specific embodiment, EM radiation subsystem 210 includes an EM source device 212 configured to generate EM radiation 211 at a specified excitation frequency (e.g., one of a laser, a lamp, a light-emitting diode (LED), and a terahertz (THz) light source). In some embodiments optical subsystem 215 includes one or more focusing lenses and optional filters that are positioned between device 212 and target fixture 220 and configured to operably direct light along path P to target structures 100. In other embodiments EM radiation is generated and directed along path P by device 212 (i.e., optical subsystem 215 is omitted entirely). In another embodiment, EM radiation subsystem 210 includes a broadband light source 212, and optical subsystem 215 includes a spectrally selective filter configured to exclusively transmit (pass) EM radiation at the desired excitation frequency along path P (i.e., frequencies other than the desired excitation frequency are prevented from reaching target structures 100 by the filter). In yet another specific embodiment, EM radiation subsystem 210 omits an EM generating device, and instead, utilizes an external broadband light source, such as the sun. In this case, EM radiation subsystem 210 only comprises an optical subsystem 215 that is operably configured (e.g., by way of spectrally selective filters and focusing lenses) to direct EM radiation 211 having desired excitation frequency $\upsilon$ along path P to target structures 100.

According to an aspect of the invention, EM radiation subsystem 210 is configured to generate EM radiation 211 at a specific excitation frequency $\upsilon$ and power density that operably generates plasmon oscillations in target structures 100. In practical applications, EM radiation 211 has an excitation frequency $\upsilon$ in the range of $10^{12}$ Hz to $10^{16}$ Hz, where the upper bound of excitation frequency $\upsilon$ is determined by frequencies above which target structures 100 are nearly entirely (i.e., greater than 99%) transparent to radiation, and the lower bound of excitation frequency $\upsilon$ is determined by frequencies below which target structures 100 becomes nearly completely reflective to radiation. The range of excitation frequency $\upsilon$ can be quantified in terms of the plasma frequency of the electrically conductive material used in the formation of target structures 100, where the plasma frequency determines the upper bound (i.e., above which the target 220 becomes nearly entirely transparent to radiation), and a reasonable lower bound may be set to 0.001 times the plasma frequency. In one embodiment, each target structure 100 is configured using techniques described below to have an inherent surface plasmon resonance frequency, and EM radiation subsystem 210 is configured to generate EM radiation 211 such that excitation frequency $\upsilon$ corresponds with (e.g., is substantially within the frequency width of the resonance) the plasmon resonance frequency of target structures 100. In another embodiment, the electrically conductive material used to form each target structure 100 exhibits an inherent static conduction electron carrier density, and EM radiation subsystem 210 is configured to generate EM radiation 211 at an intensity required to induce a carrier density oscillation amplitude in the range of 0.1 to fifty (50) times the static conduction electron carrier density of the electrically conductive material. EM radiation subsystem 210 is also configured such that EM radiation 211 has a power density sufficient to generate large amplitude oscillation in the electron charge density, but below the ablation threshold of target structures 100 (i.e., power densities greater than the ablation threshold cause physical removal/destruction of the material forming target 220). In a practical embodiment, the upper bound power density is set at the power densities used in laser beam welding, which are on the order of 1 MW/cm$^2$.

According to an aspect of the invention, target structures 100 are mounted on target fixture 220 such that each target structure 100 is electrically isolated (e.g., separated by way of an intervening dielectric structure, which may be a solid, liquid, gas, or vacuum) from all adjacent target structures 100. As indicated at the bottom of FIG. 1, each target structure 100 includes an integral (i.e., single piece and electrically isolated) body 101 having a peripheral surface region 102 that is formed entirely using an electrically conductive material. In a presently preferred embodiment the electrically conductive material incorporates light element (L) atoms 107 (e.g., hydrogen, deuterium, tritium, lithium or boron) into a matrix formed by other electrically conductive material) atoms 108 (i.e., either a metal or an electrically conductive light element material such as boron, beryllium or lithium, collectively labeled "X" in the figures). To indicate its electric conductivity, the electrically conductive material is shown to include free electrons (i.e., delocalized conduction electrons) 109 (labeled "e" in the figures) . In a presently preferred embodiment, the electrically conductive material utilized to form target structure 100 has a large solubility of light element atoms (i.e., at least 1 atomic percent, and preferably greater than 10 atomic percent). Exemplary specific electrically conductive materials meeting this requirement and suitable for generating target structures 100 are described below. As indicated in the lower portion of FIG. 1, integral body 101 also includes a core region 103, which is surrounded by surface region 102, where core region 103 optionally comprises either the same electrically conductive material as that forming surface region 102, a different material (e.g., a dielectric or a fluid, or a void/vacuum). In the absence of an applied electric field, free electrons 109 are typically evenly distributed throughout integral body 101 in the manner depicted in FIG. 1. In at least some specific embodiments described below, each integral body 101 is configured using one or more of a specific outer shape (e.g., a sphere) and a specific size (e.g., diameter D) to undergo plasmon (electron density) oscillations at a desired plasmon resonance frequency (i.e., the plasmon resonance frequency of each target structure 100 is at least partially determined by the shape and/or size of its integral body 101), thereby simplifying the electron screening effect enhancement process described below. As mentioned above, the specific composition of the electrically conductive material forming surface region 102 of each target structure 100 determines that target structure's plasma frequency.

Figure 2A:
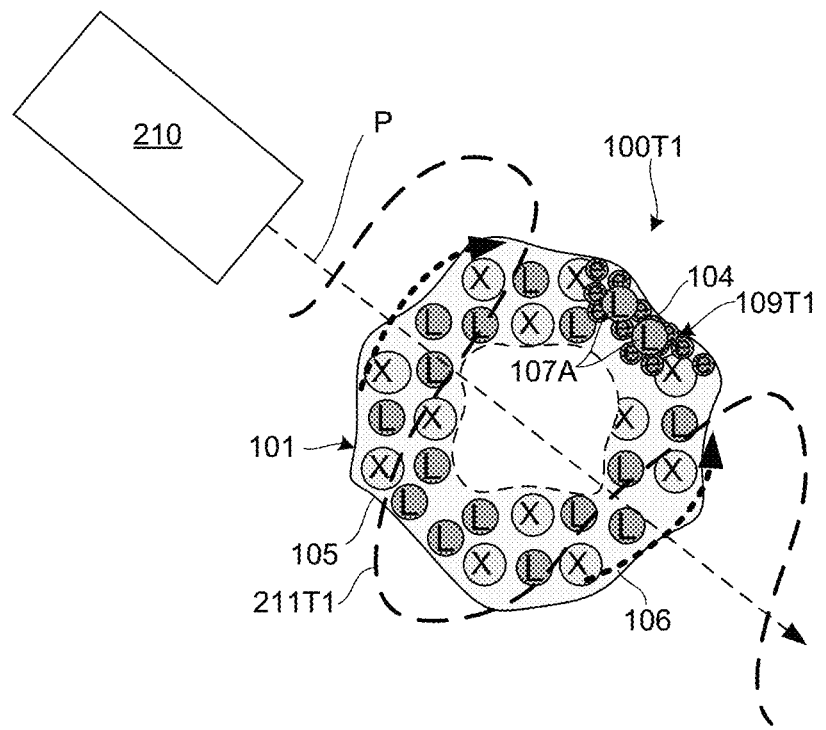
FIGS. 2(A) and 2(B) are cross-sectional side views depicting plasmon oscillations in a target structure during operation of the system shown in FIG. 1.
Figure 2B:
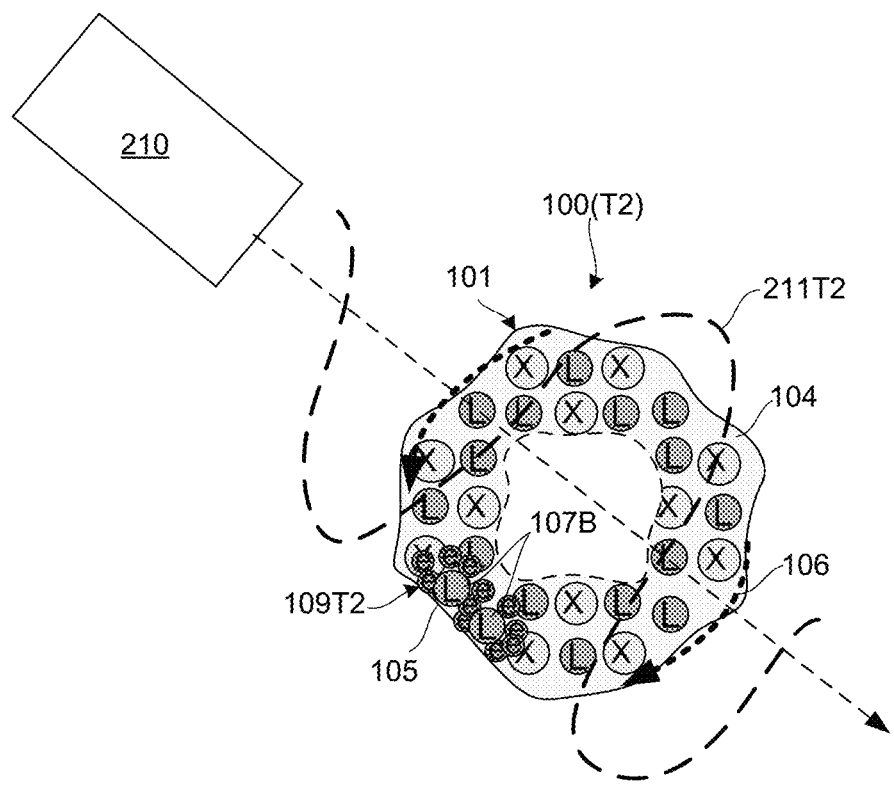

FIGS. 2(A) and 2(B) depict the operation of system 200 (see FIG. 1) during a single plasmon oscillation cycle. More specifically, FIGS. 2(A) and 2(B) depict the movement of free electrons in an exemplary target structure 100 at two separate time moments (i.e., time T1 and a subsequent time T2) during the single plasmon oscillation cycle. Note that "T1" and "T2" are appended to corresponding reference numbers to emphasize differences between corresponding features at the two time moments. For example, FIG. 2(A) depicts target structure 100 at a time T1 (indicated by "100T1") when EM radiation 211T1 emitted from EM radiation subsystem 210 has a first phase, and FIG. 2(B) depicts target structure 100 at a time T2 (indicated by "100T2") when EM radiation 211T2 has a second phase, which is 180° different from the first phase.

According to an aspect of the invention, EM radiation 211 is generated such that integral body 101 of target 100 undergoes surface plasmon oscillations in a manner that causes free electrons (e) to move in integral body 101 during each plasmon oscillation cycle such that electron density variations of at least 10% are generated around light element atoms L located in localized regions 104 and 105. Referring to FIG. 2(A), the electric field applied by EM radiation 211T1 during the first phase causes the free electrons contained in integral body 101 to move along intervening regions 106 away from localized region 105 and toward localized region 104, as indicated by the dashed-line arrows. Some of the free electrons rapidly converge in localized region 104, and, at the peak convergence coinciding at time T1, form a first dense electron cloud 109T1 that produces a brief but significant charge density level increases in localized region 104 (i.e., at least a 10% increase in charge density over at-rest conditions). Subsequently, as depicted in FIG. 2(B), as the phase of the applied EM radiation changes, and the electric field applied by EM radiation 211T2 causes the free electrons to move back along intervening regions 106 (i.e., away from localized region 104 and toward localized region 105, as indicated by the dashed-line arrows). Accordingly, some of the rapidly converging free electrons form a second dense electron cloud 109T2 that produces another significant charge density level increase in localized region 105 at time T2. Electron clouds 109T1 and 109T2 are thus generated during each plasmon oscillation cycle during the operation of system 200 (FIG. 1). Because the charge densities generated by electron clouds 109T1 and 109T2 are rarified and concentrated in separate but nearby portions (referred to as "localized regions" for explanatory reasons) of integral body 101, and because the regions of concentration and rarefaction are oscillating, the electrically conductive material from which target structure 100 is formed does not rapidly disintegrate, as it would if a comparable charge density were attempted to be introduced statically. This is a useful aspect of this invention, because, were such a large change in charge density to be made statically in the material, it is expected that the chemical bonds within the material would break and the material would decompose. It is therefore an aspect of this invention to vary electron densities in the material at a rate that is faster than that which would result in chemical decomposition, while occurring slowly enough to screen the Coulomb barrier in a nuclear fusion reaction, which generally coincides with the range of $10^{12}$ Hz to $10^{16}$ Hz set forth above.

Figure 3A:
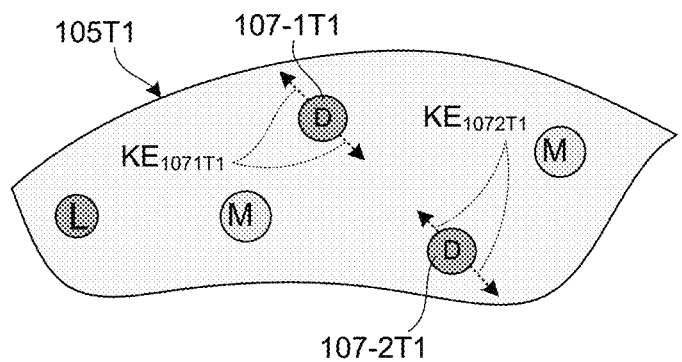
FIGS. 3(A) and 3(B) are enlarged partial cross-sections showing the generation of dense electron cloud in a localized region of the target structure depicted in FIGS. 2(A) and 2(B)
Figure 3B:
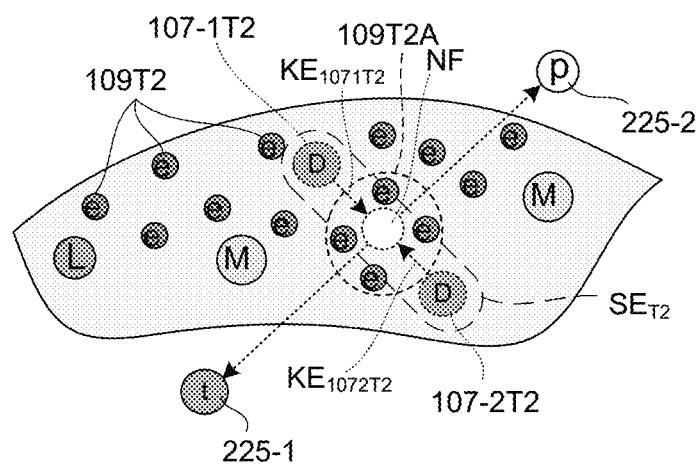

FIGS. 3(A) and 3(B) depict an enlarged portion of localized region 105 at time moments T1 and T2, and in particular illustrate an exemplary fusion event occurring between two deuterium (light element) atoms 107-21 and 107-22 in localized region 105 at time moments T1 and T2. Referring to FIG. 3(A), localized region 105T1 contains two deuterium atoms 107-1T1 and 107-2T1 and additional atoms that are maintained by the structural matrix in a spaced apart relationship. Deuterium atoms 107-1T1 and 107-2T1 typically have kinetic energies $KE_{107_1T1}$ and $KE_{107_2T1}$, respectively, due to thermal vibrations, but these kinetic energies are almost always insufficient to overcome the Coulomb barrier forces that prevent atoms 107-1T1 and 107-2T1 from reaching a proximal distance required for nuclear forces to take over and pull the two atoms together. In contrast, as illustrated in FIG. 3(B), the presence of electron cloud 109T2 produces a brief but significant charge density level increase in localized region 105T2. Although the charge density is enhanced in localized region 105T2 for a relatively short time period during each electron density oscillation cycle, the peak charge density levels generates enhanced Coulomb repulsion screening, which according to the model described earlier produces screening potential energies $SE_{T2}$ that are substantially higher than those achievable by conventional (static charge density) screening techniques. Increased electron density enhances screening potential energies $SE_{T2}$, increases the fusion cross section and reduces Coulomb repulsion, due to the presence of a corresponding portion 109T2A of electron cloud 109T2 between deuterium (light element) atoms 107-1T2 and 107-2T2. Due to enhanced screening potential energies $SE_{T2}$, the probability for nuclei 107-1T2 and 107-2T2 to tunnel through the Coulomb repulsion barrier is significantly increased, thereby increasing the probability of achieving the nuclear fusion event NF depicted in FIG. 3(B), whereby tritons (t) 225-1 and protons (p) 225-2 are expelled from localized region 105T2 in response to the fusion of nuclei 107-1T2 and 107-2T2. In this way, by configuring the target structures to undergo electron density oscillations in the manner described above, the present invention achieves significantly increased fusion reaction rates in comparison to conventional approaches.

Referring again to FIG. 1, detector 230 is positioned to detect particles 225 expelled from target structures 100 during nuclear fusion events NF (e.g., the fusion of deuterium atoms 107-1 and 107-2 that produce triton 225-1 and proton 225-2). A fusion cross section of target structures 100 is then measured, for example, by way of utilizing detector 230 to count the number of energetic protons that are emitted from each target structure from the D(d,p)T reactions. By configuring target structures 100 to undergo electron density oscillations when subjected to EM radiation 211 having a particular excitation frequency υ, system 200 achieves significantly higher electron screening energies than those achieved using conventional approaches by inducing rapidly changing electron densities in the presence of light element ions (e.g., those that are located in localized regions 104 and 105 of each target structure 100), thereby significantly enhancing the cross section of these light element atoms, and thus improving nuclear fusion reaction rates. In contrast to this novel approach, all conventional approaches attempting to demonstrate enhanced fusion cross sections caused by electron screening do so by measuring the fusion cross section in the presence of a static (i.e., not rapidly changing) electron densities. A problem with these conventional static electron density approaches is failure to provide the necessary combination of structural features and EM radiation at resonant frequencies that are required to produce the rapid time-varying electron clouds in the manner taught by the present invention, and therefore suffer from an inherent static electron density magnitude limitation. In summary, a distinguishing aspect of the presently invention over conventional static electron density approaches is the generation of rapid time-varying changes to electron densities in light-element-containing materials to enhance the rate of fusion reactions.

A key insight leading to the present invention is the realization that the time scale of a fusion reaction is very rapid (i.e., very much less than 1 femtosecond), and hence from the standpoint of electron screening, the time varying changes in electron density produced by plasma oscillation, occur slowly enough to significantly alter the rate of fusion by screening the Coulomb potential. A nuclear fusion reaction, being a physical process involving energy changes on the order of MeV, is inherently fast, involving interactions that begin and end in less than $10^{-20}$ seconds. It is a fair statement that such reactions are adiabatic with respect to the comparatively slow changes in electron density that occur in electron density oscillations taking place on a timescale of $10^{-15}$ sec or longer.

Another key insight to the present invention is the realization that the size of changes to the electron density, although they are time-varying, can be quite large. Electron density oscillations, and in particular, surface plasmon resonances, are well known to produce very large electric fields. Perhaps not as fully appreciated as field intensity, is the correspondingly large changes in electron density that accompanies such large electric fields in surface plasmon resonances. In the presence of a strong electromagnetic field, such as may be applied with a laser tuned to the surface plasmon resonance frequency of a target structure, the amplitude of a charge density oscillation can vary the charge density by at least a factor of two. Although an upper limit on the amplitude of the charge density oscillation is currently not well established, theoretical work by Marty et al. (1 Feb. 2010, Vol. 18, No. 3, OPTICS EXPRESS pp. 3035-3044) suggests that during resonant surface plasmon excitation, the electron carrier density can reach 0.73 femtocoulombs/nm³, which is about 45 times larger than the static free carrier density in gold.

Perhaps the simplest model with which to estimate the efficacy of the present invention is the Debye Screening model of the screened Coulomb potential. According to this model, the Coulomb potential, $-e^2/r$, which is responsible for the repulsion between two positively charged nuclei at distances greater than about 1 fm, is reduced by an exponential factor, resulting in a screened potential $$V(r)=(e^2/r)\exp(-r/d)$$

where r is inter-nuclear distance, e is charge, and d is the screening length. The exponential factor, when expanded by its Taylor series, has a first order term that lowers the unscreened Coulomb potential by a constant factor of $-e^2/d$. This constant factor is equivalent to the screening energy described above. The Debye screening length, and hence the screening energy, scales as the square root of the carrier density. Based on this simple model, if the carrier density could be doubled, then a 41% increase in screening energy could be expected. Although the Debye screening model may not capture the subtleties of all screening effects that may be at work in the proposed invention, it offers a useful prediction of the causal effect of electron density on fusion cross section. Because the charge density is rarified and concentrated in separate but nearby portions of the material, and the regions of concentration and rarefaction are oscillating, the material does not disintegrate. This is a useful aspect of this invention, because, were such a large change in charge density to be made statically in the material it is expected that the chemical bonds within the material would break and it would decompose. It is therefore an aspect of this invention to vary the electron density of the material at a rate that is faster than what would result in chemical decomposition, while occurring slowly enough to screen the Coulomb barrier in a nuclear fusion reaction.

Other key insights arise from the failure of other approaches to achieve comparable charge density increases in light element materials. One such insight stems from examining the possibility of enhancing the carrier density with an electrostatically applied electric field. The problems encountered included the very short screening length and the very small increases in carrier density. Another key insight stems from examining the efficacy of shining electron beams onto a material to enhance its carrier density, which was found to be far less effective at enhancing the carrier density than the plasmon oscillation approach of the present invention.

Another key insight stems from the consideration that surface plasmon oscillations concentrate electron charges in a conductor at and just below the interface with a dielectric. It is a useful coincidence of nature that when the dielectric is a hydrogen gas environment, (as shown by S-Y Huang et al., "Chemical Activity of Palladium Clusters: Sorption of Hydrogen" J. Phys. Chem B, 110, 21783-21787) the hydrogen is preferentially adsorbed and concentrated at the surface of the metal. If one wanted to produce a structure that concentrates light elements such as hydrogen, deuterium or tritium, in combination with electrons to screen the Coulomb repulsion between the light element nuclei, this is exactly what one would want.

Figure 4:
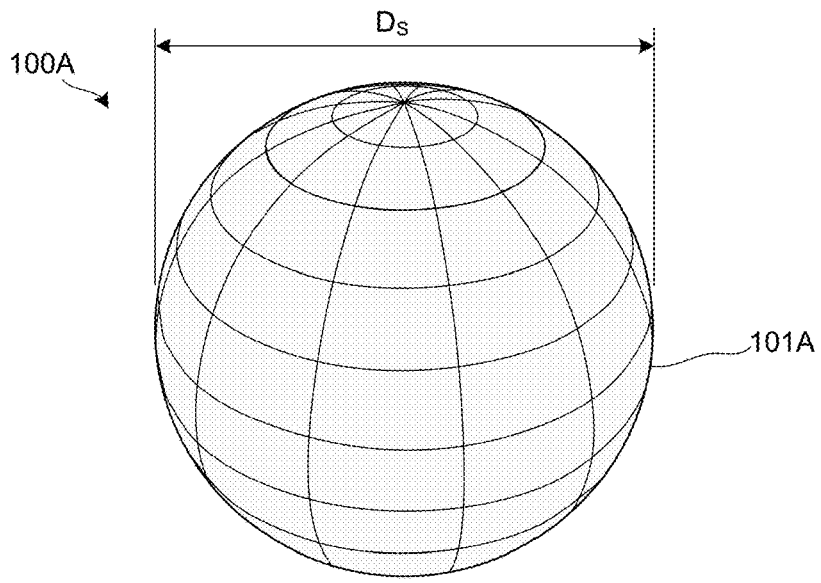
FIG. 4 is a perspective view showing an exemplary target structure having a solid spherical body according to a specific embodiment of the present invention.

FIG. 4 depicts a target structure 100A according to a specific embodiment in which integral body 101A is in the form of a solid spherical nanostructure (i.e., having a diameter $D_s$ in the range of 1 nm to 1,000 nm. Consistent with the description above, target structure 100A has an integral body 101A consisting essentially of an electrically conductive material and is otherwise configured (i.e., by way of its spherical shape and nanometer-sized diameter) such that free electrons undergo plasmon oscillations when the excitation frequency of an applied EM radiation is at or above an extremely-high frequency (i.e., $10^{12}$ Hz and above), whereby periodic charge density variations are generated in at least two localized regions of integral body 101A.

Figure 5A:
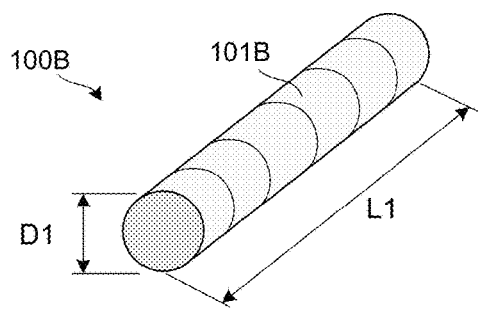
FIGS. 5(A), 5(B), 5(C), 5(D) and 5(E) are perspective views respectively showing exemplary target structures according to alternative embodiments of the present invention.
Figure 5B:
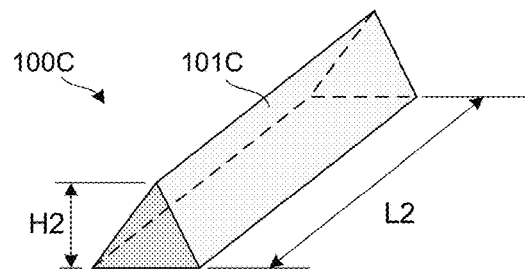
Figure 5C:
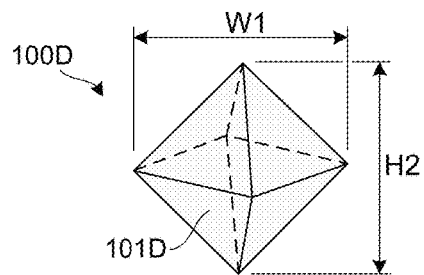
Figure 5D:
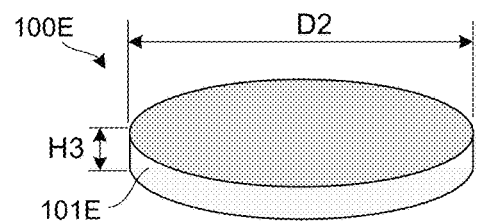
Figure 5E:
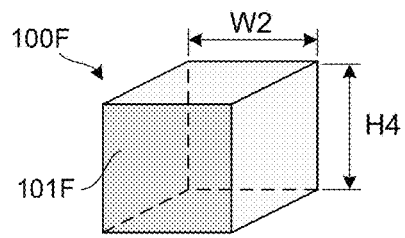

As used herein, the term "nanostructure" refers to any single-piece structure having nanometer-scale dimensions (i.e., dimensions in the range of 1 nm to 1,000 nm. For example, spherical integral body 101A qualifies as a nanostructure when diameter $D_s$ is greater than 1 nm and less than 1,000 nm. The term "nanostructure" is not limited to spheres, and applies to any geometric or arbitrary shape having requisite dimensions. For example, FIG. 5(A) shows a 100B having a rod-shaped integral body 101B defined by length dimension L1 and diameter dimension D1, where both dimensions L1 and D1 are within the range of 1 nm and 1,000 nm. FIG. 5(B) shows a nanostructure 100C including a triangular prism-shaped integral body 101C defined by length dimension L2 and height dimension H1 that are within the range of 1 nm and 1,000 nm. FIG. 5(C) shows a nanostructure 100D including an octahedron-shaped integral body 101D defined by width dimension W1 and height dimension H2 that are within the range of 1 nm and 1,000 nm. FIG. 5(D) shows a nanostructure 100E including a disc-shaped integral body 101E defined by diameter dimension D2 and height dimension H3 that are within the range of 1 nm and 1,000 nm. FIG. 5(E) shows a nanostructure 100F including a cube-shaped integral body 101F defined by width dimension W2 and height dimension H4 that are within the range of 1 nm and 1,000 nm. These examples are intended to illustrate possible nanostructure shapes, and are not intended to be limiting. Other possible nanostructures may include dimer, multimer and grating configurations.

Figure 4A:
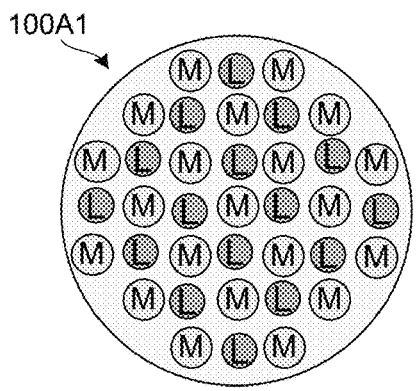
FIGS. 4(A), 4(B) and 4(C) are simplified cross-sectional side views depicting various material compositions of the target structure shown in FIG. 4.
Figure 4B:
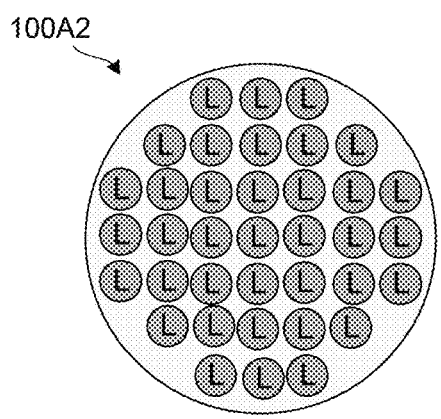
Figure 4C:
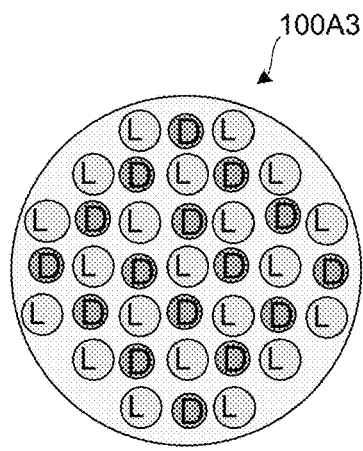

Referring again to FIG. 4, spherical nanostructure body 101A is described above as being a solid structure, where the phrase "solid structure" is used herein to mean that the space surrounded by the outer surface of integral body 101A is occupied substantially entirely by a single (i.e., the same) electrically conductive material. FIGS. 4(A) to 4(C) are simplified cross-sectional views showing solid-structure nanostructure body 101A (FIG. 4) comprising alternative exemplary electrically conductive element compositions that are suitable for producing the target structures (nanostructures) described herein.

FIG. 4(A) shows a first example in which a solid-structure body 101A1 consists essentially of a metal hydride, a metal deuteride or a metal tritide made up of metal atoms (M) and light element (e.g., hydrogen, deuterium, or tritium) atoms (L). Examples of suitable metal hydrides/deuterides include hydrides/deuterides/tritides of metals such as titanium, zirconium, vanadium, niobium, lanthanum, nickel, iron and palladium as well as alloys thereof. In one embodiment, the electrically conductive material may contain more than one type of light element such as metal hydrides of composition $MH_xD_yT_z$, where M is a metal, H represents hydrogen atoms, D represents deuterium atoms, and T represents tritium atoms, and where the sum of components x, y and z is at least 0.1 times (i.e., 10% of) the quantity of metal atoms M. Examples of such materials include metal and metallic alloy hydrides, where M is Pd, Ti, Zr, V, Nb, La, Fe, Rh, Cr, Fe, Ta, Ni, Ag, Ta, Cu, Zr, Hf, and alloys thereof. A number of materials can serve as hosts for light element fusion, but it is also an important embodiment for the material to retain a high degree of conductivity to allow for significant polarization. According to F. Raiola et al./Physics Letters B 547 (2002) 193-199, Gold, silver, aluminum, copper, and titanium also show limited fusion cross section enhancement, so in another embodiment, the materials detailed here are those showing high screening energies in prior reports as well as closely related elements and alloys. Materials with relatively high screening parameters (>300 eV) while retaining high conductivity when treated with light elements include vanadium, iron, nickel, niobium, tantalum, rhodium, palladium, rhenium, iridium, platinum, and lead. It is worth noting however that low energy ion beam fusion experiments, like those conducted by Raiola and others are often challenging to interpret and are sensitive to surface contamination, so some of the published values for screening energies may be less accurate than suggested. Alloys containing particularly promising elements such as FeTi, LaNi$_5$, PdRh, PdAg, and VCrTiFe are also material targets, as they present a slightly altered electronic structure from the aforementioned pure elements, which can respond differently to oscillating electron density. Accordingly, unless otherwise specified in the appended claims, the electrically conductive material utilized to form the integral bodies of the recited target structures and nanostructures is understood to include any of the metals and metal alloys mentioned above, along with normal contaminants typically captured in the metal matrix when these structures are formed using known techniques.

In other embodiments, the electrically conductive material forming simplified target structure 100A (FIG. 4) may consist entirely of an electrically conductive light element material (i.e., wherein other materials such as metal atoms are omitted). For example, FIG. 4(B) depicts a solid-structure body 101A2 consisting essentially entirely of light element atom L (e.g., boron, lithium, or a combination thereof), and FIG. 4(C) depicts a solid-structure body 101A3 consisting of a hydride of a light element (e.g., lithium hydride), where deuterium atoms D are dispersed within the light element atoms L.

Although solid structure-type nanostructures are currently preferred, in other possible embodiments each integral body may comprise multiple substructures or multiple layers. There is utility to the proximal arrangement of materials that separately and in combination provide both the desired electronic and chemical properties necessary for high amplitude oscillation in electron density and light element concentration. An additional utility in the adjustment of one or more of the material's electronic properties is achieved through tailoring of the electronic structure. One of the simplest models of electronic screening is based on the theory of Thomas and Fermi. According to this model, both carrier density and effective mass play a role in screening of electrical charge. Therefore, it is an aspect of this invention that one of charge density and effective mass may be usefully chosen to influence the electron screening effect described herein.

Figure 6:
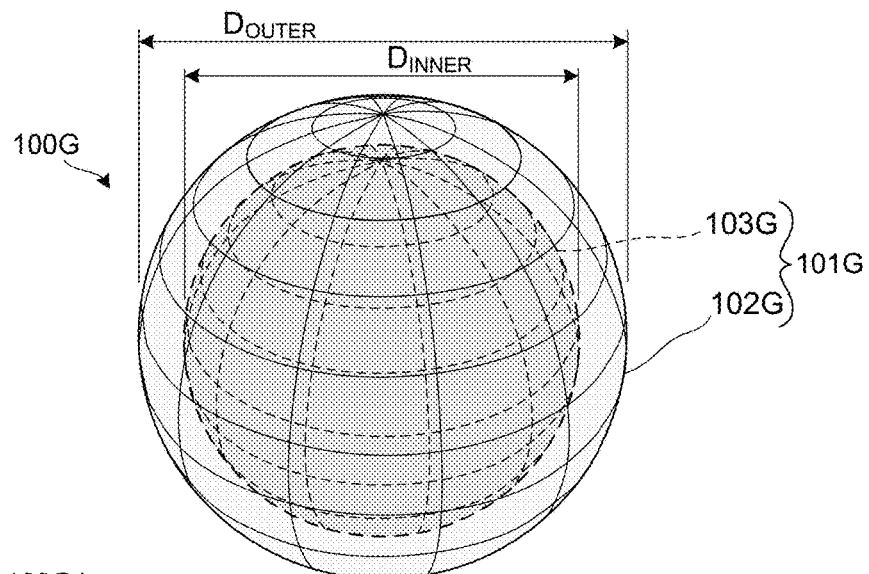
FIG. 6 is a perspective view showing another exemplary target structure having a two-part spherical body according to a specific embodiment of the present invention.

FIG. 6 illustrates a target structure 100G including an integral body 101G comprising a two-layered spherical nanostructure, which serves as an example of a multiple layered nanostructure. In this case, integral body 101G includes a spherical outer shell (peripheral surface region) 102G having a diameter $D_{OUTER}$ surrounding a spherical inner core 103G having a diameter $D_{INNER}$, where $D_{OUTER}$ is greater than $D_{INNER}$, and both $D_{OUTER}$ and $D_{INNER}$ are within the range of 1 nm and 1,000 nm.

Figures 7A, 7B:
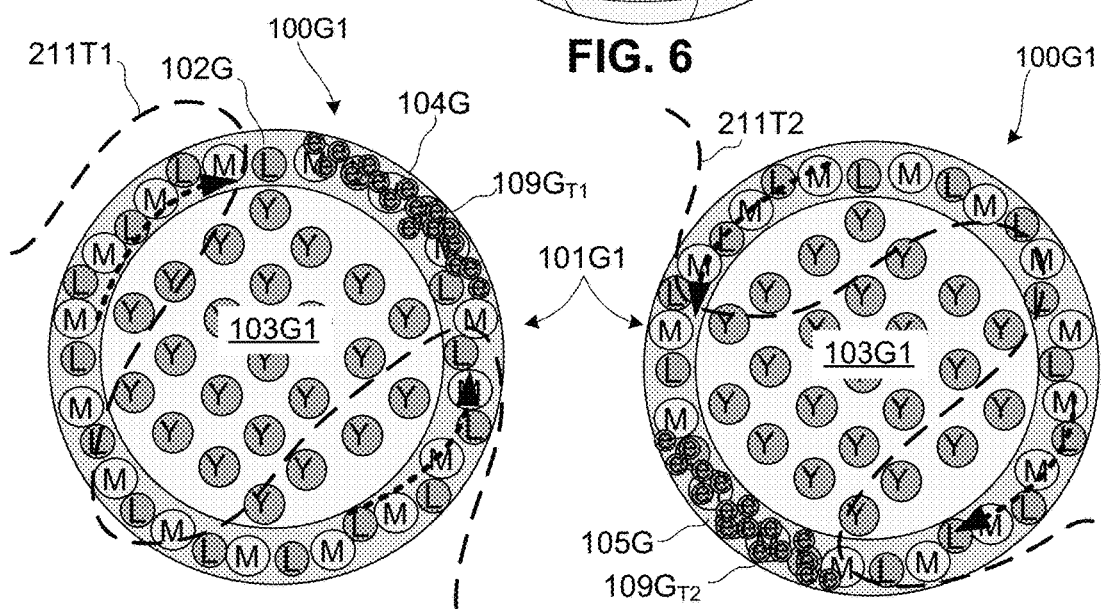
FIGS. 7(A) and 7(B) are cross-sections depicting an exemplary material composition of the target structure shown in FIG. 6 during operation.

FIGS. 7(A) and 7(B) depict a target structure 100G1 according to a first exemplary embodiment of a core-shell (multiple-layered) nanostructure configuration in which integral body 101G1 includes an electrically conductive outer shell 102G1 (e.g., formed by metal atoms M and light element atoms L) and an inner core 103G1 comprising a second material made up of atoms Y. In a presently preferred embodiment, outer shell 102G1 comprises an electrically conductive material of the types described above, and inner core 103G comprises a second material (e.g., a solid dielectric material) having a lower electrical conductivity than that of the electrically conductive material forming outer shell 102G. In an alternative embodiment, both outer shell 102G1 and inner core 103G1 comprise solid electrically conductive materials, with outer shell 102G1 formed using one of the electrically conductive light element materials of the types described above, and inner core 103G comprising a second conductive material (e.g., a metal such as gold). In one embodiment, integral body 101G1 comprises a heteroepitaxial structure wherein both inner core 103G1 and outer shell 102G1 are composed of crystalline materials. This heteroepitaxial structure may be usefully engineered to induce pseudomorphic strain between the epitaxial layers in order to influence and beneficially modify the electronic and or chemical behavior of outer shell 102G1. That is, metals can be grown epitaxially on dielectrics, and thus, it is possible that a metal shell on a dielectric core could experience pseudomorphic strain that would influence its absorption of hydrogen. With such a dielectric core and metal shell structure, a surface plasmon could produce regions of large charge density on either the inner surface or on the outer surface of a shell or both surfaces, depending on the mode excited. In the case where a metal such as palladium is grown as a shell around a gold core, there would be no large charge density oscillation at the metal-metal interface; but a surface plasmon could develop at the outer surface of the palladium shell. Epitaxial growth of the palladium on the gold would induce pseudomorphic strain in the Pd, which would beneficially influence its absorption of hydrogen.

Figure 8:
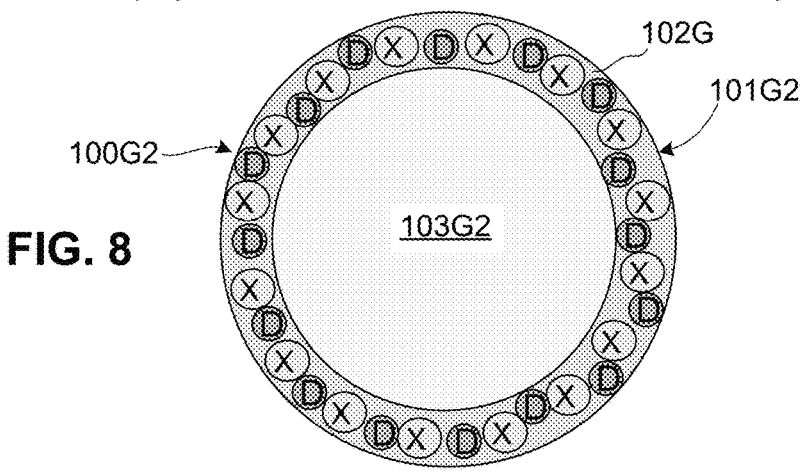
FIG. 8 is a cross-section depicting another exemplary material composition of the target structure shown in FIG. 6.

FIG. 8 depicts a nanostructure 100G2 according to a second exemplary core-shell (multiple-layered) nanostructure configuration in which an integral body 101G2 includes an outer shell 102G2 formed by metal or light element atoms X and deuterium atoms D, and inner core 103G2 is either a void (i.e., a vacuum) or filled with a gas or liquid (i.e., a fluid) having a low electrical conductivity (e.g., a dielectric gas such as air).

In the exemplary core-shell embodiments, plasmon oscillations takes place as illustrated in FIGS. 7(A) and 7(B), which depicts electrons moving in one direction in outer shell 102G1 (as indicated by the dashed-line arrows in FIG. 7(A)) to form a first electron cloud $109G_{T1}$ in localized region 104G during a first applied EM radiation phase 211T1 of each plasmon oscillation cycle, and then electrons move in the opposite direction inside outer shell 102G1 (as indicated by the dashed-line arrows in FIG. 7(B)) to form a second electron cloud $109G_{T2}$ in localized region 105G during a second applied EM radiation phase 211T2.

Figure 9:
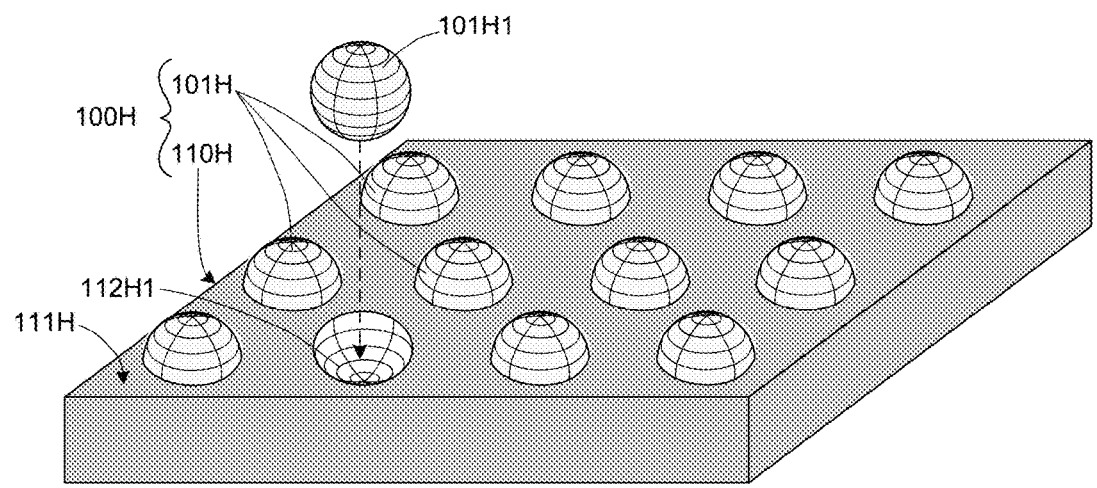
FIG. 9 is a perspective view showing another exemplary target structure including multiple integral bodies attached to a base according to another specific embodiment of the present invention.
Figure 10A:
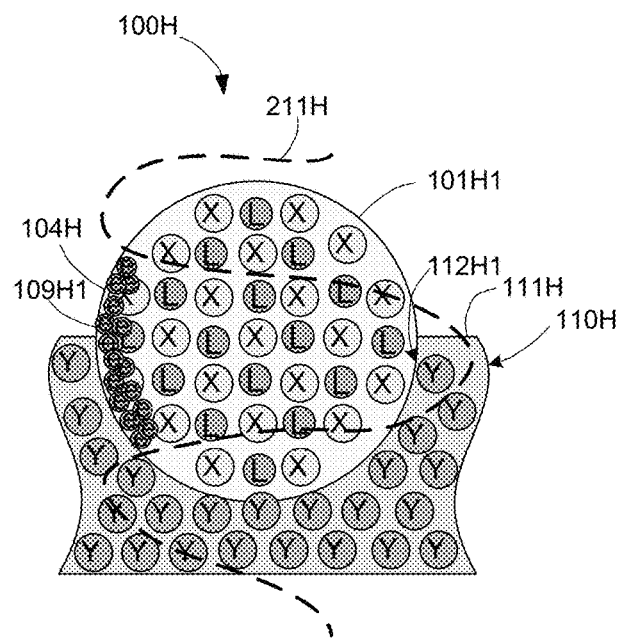
FIGS. 10(A) and 10(B) are cross-sections depicting an exemplary material composition of the target structure shown in FIG. 9 during operation.
Figure 10B:
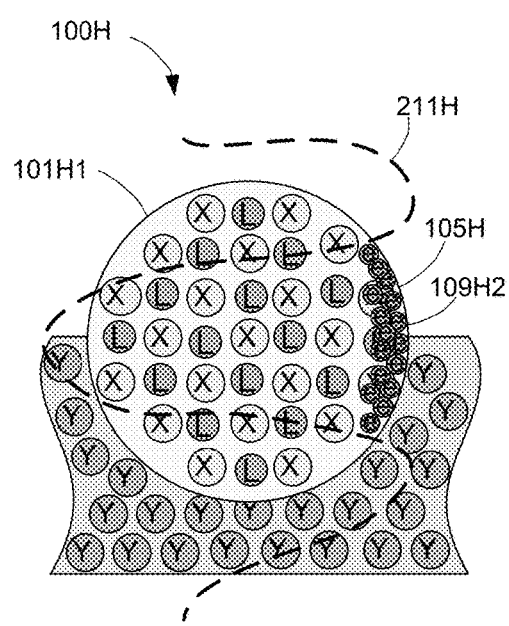

In other embodiments, each target structure may comprise two or more integral bodies, each integral body being of any of the types described above, wherein the integral bodies are maintained in a fixed array or other pattern by way of a suitable base structure, wherein the base structure is made of a material having a lower conductivity that that of the integral bodies. FIG. 9 shows one such example in which multiple spherical integral bodies 101H are fixedly connected to a planar base 110H such that spherical integral bodies 101H are maintained in a spaced-apart relationship by way of their connection to base 110H. The connections may be implemented by embedding at least a portion of each spherical integral bodies 101H into a surface 111H of base 110H (e.g., integral body 101H1 is depicted as being mounted into semi-spherical opening 112H1 extending from surface 111H into base 110H, as depicted in FIGS. 9 and 10(A)). In an exemplary embodiment, each integral body 101H comprises a nanostructure formed using any of the electrically conductive materials mentioned above (e.g., a solid spherical nanostructure of the type described above with reference to FIG. 4), and base 110H comprises a dielectric material (e.g., $SiO_2$ SiN, $Al_2O_3$, MgO, glass, diamond, or ceramic). With this configuration, plasmon oscillation is generated in each integral body 110H1 in response to applied EM radiation of the type described above (e.g., as depicted in FIGS. 10(A) and 10(B), integral body 110H1 undergoes plasmon oscillations during which electron cloud 109H1 is formed in localized region 104H of integral body 101H during a first phase of EM radiation 211H, and electron cloud 109H2 is formed in localized region 105H of integral body 101H during a second phase of EM radiation 211H).

According to another embodiment, charge densities generated on the integral bodies of the target structures are enhanced by way of being placed in proximity to highly conductive metal structures. It is well known that some metals are better electrical conductors than others. Silver, gold and copper, for example, are often used for plasmonic structures because of their high conductivity. However, these materials do not readily absorb light elements. Metals, such as palladium, that absorb light elements (i.e., hydrogen, deuterium, and tritium) tend to be less conductive than silver gold and copper, and moreover, such metals typically become even less electrically conductive over at least a portion of their alloy composition in comparison to their elemental form. According to the present embodiment, target structures of the types described above benefit from interaction with at least one highly conductive metal structure (referred to below as an antenna), which are utilized to produce high local electric fields that enhance charge densities generated on the integral bodies. That is, both the antenna and the integral body are excited in response to an applied EM radiation, but the highly conducting metallic material of the antenna produces higher local fields than those generated by the less conductive material of the integral body. By placing the integral body in proximity to (but not in metallic contact with) the antenna structure, the high electric field generated by the antenna induces a greater change in the charge density of the integral body. A specific embodiment implementing this concept using a bowtie antenna arrangement is described below with reference to FIGS. 11, 12(A) and 12(B). However, those skilled in the art will recognize that implementations of this concept may be implemented, for example, by way of replacing at least one of the integral bodies 101H of target structure 100H (see FIG. 9, described above) with a highly conducting metallic sphere.

Figure 11:
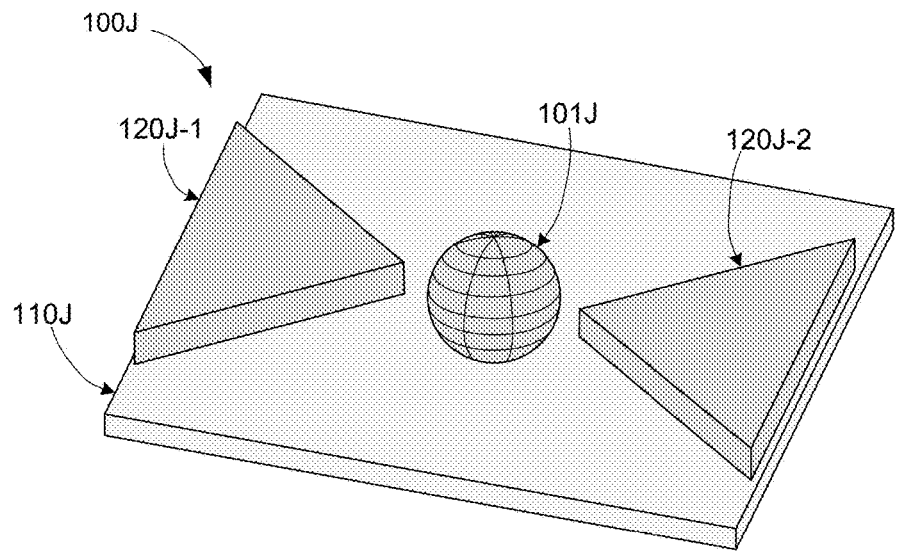
FIG. 11 is a perspective view showing another exemplary target structure including an integral body and at least one antenna structure according to another specific embodiment of the present invention.
Figure 12A:
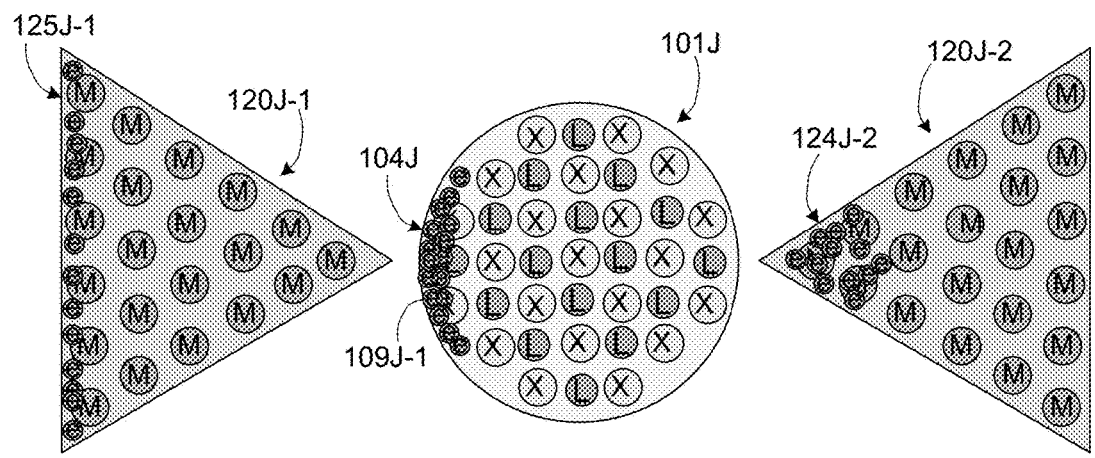
FIGS. 12(A) and 12(B) are cross-sections depicting an exemplary material composition of the target structure shown in FIG. 11 during operation.
Figure 12B:
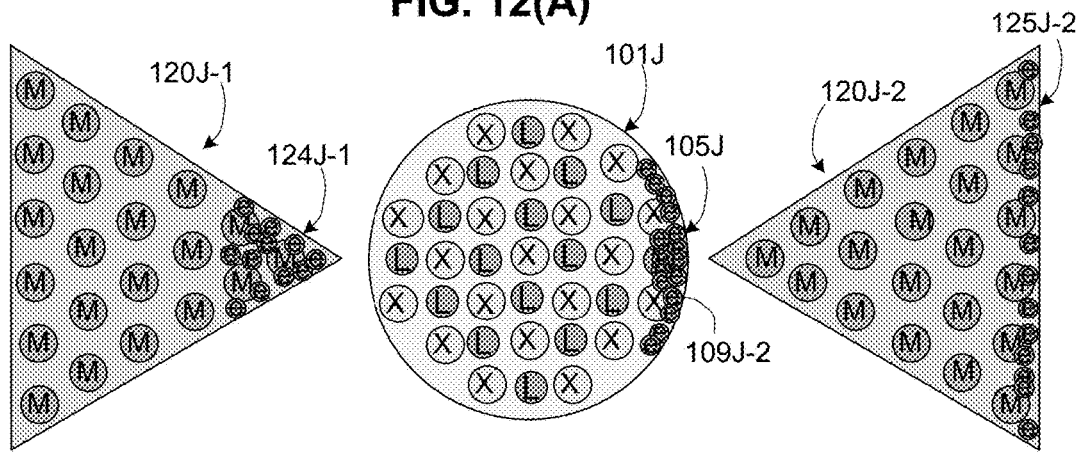

FIG. 11 depicts a target structure 100J including two antenna structures 120J-1 and 120J-2 that are fixedly disposed adjacent to (e.g., on opposite sides of) an integral body 101J in a bowtie arrangement. Note that a spacing between antenna structures 120J-1 and 120J-2 and integral body 101J is maintained, for example, by way of fixed connection of all three structures to a solid dielectric base structure 110J. In this embodiment, each antenna structure 120J-1 and 120J-2 comprises a triangular-shaped highly conducting metallic structure of the type mentioned above, wherein both antenna structures 120J-1 and 120J-2 are oriented such that narrow (tip) ends of each antenna structures 120J-1 and 120J-2 is pointed toward integral body 101J. As indicated in FIGS. 12(A) and 12(B), with this configuration, an applied EM radiation (not shown) simultaneously interacts with both antenna structures 120J-1 and 120J-2 and integral body 110J, whereby, during a first phase, electrons are moved to first regions of each structure (e.g., as shown in FIG. 12(A), into localized region 104J of integral body 101J, wide end region 124J-1 of antenna structure 120J-1, and tip end region 125J-2 of antenna 120J-2), and, during a second phase, electrons are moved to second regions of each structure (e.g., as shown in FIG. 12(B), into localized region 105J of integral body 101J, narrow end region 125J-1 of antenna structure 120J-1, and wide end region 124J-2 of antenna 120J-2). Note that the concentration of electrons at the tip ends of each antenna structure 120J-1 and 120J-2 (i.e., shown at tip end region 124J-2 in FIG. 12(A) and tip end region 124J-1 in FIG. 12(B)) produces enhanced local fields that are applied to integral body 101J, whereby modified electron clouds 109J-1 and 109J-2 are respectively generated in localized regions 104J and 105J during each plasmon oscillation cycle.

Figure 13:
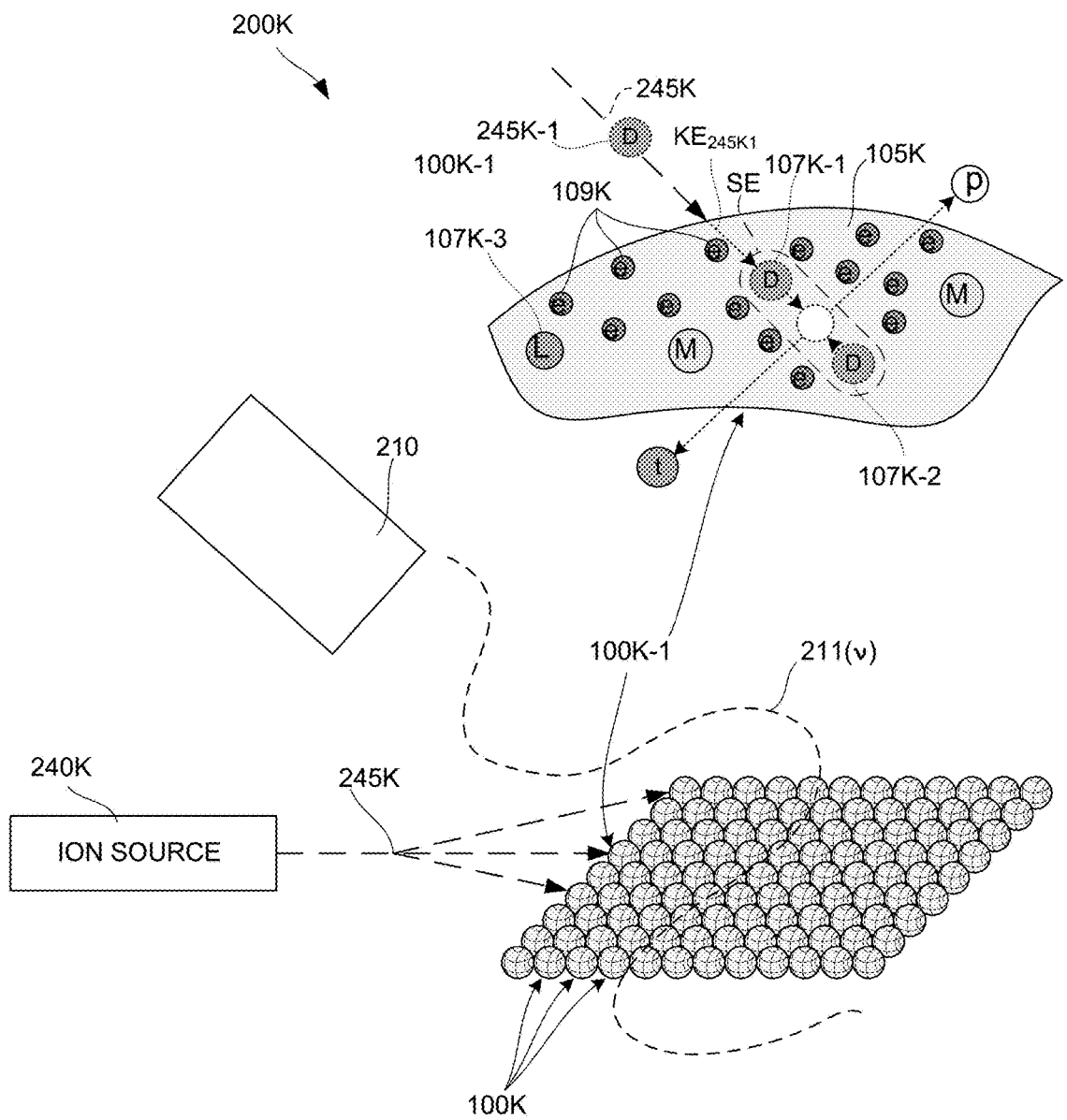
FIG. 13 is a top side perspective view depicting another exemplary system for achieving enhanced Coulomb repulsion screening according to an alternative simplified embodiment of the present invention.
Figure 14:
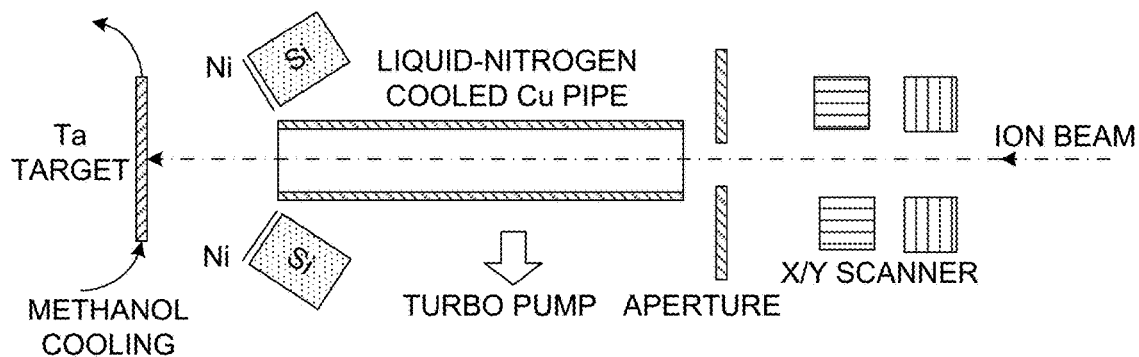
FIG. 14 is a diagram depicting a conventional scattering experiment.
Figure 15:
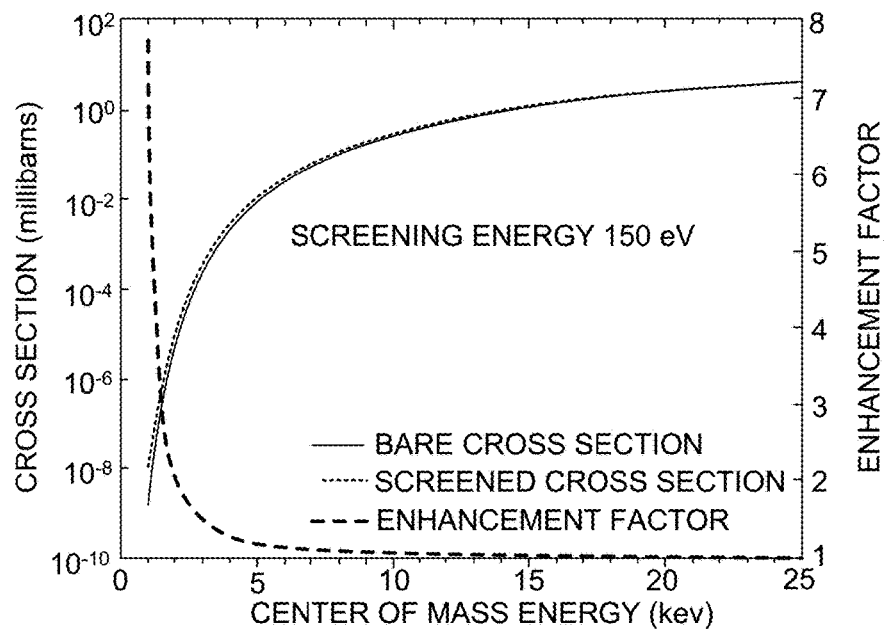
FIG. 15 is a graph depicting screening energies produced using conventional approaches.

FIG. 13 depicts an alternative system 200K including EM radiation subsystem 210 and target structures (e.g., nanostructures) 100K similar to those described above with reference to FIG. 1, wherein system 200A also includes an ion source 240K that is configured to direct a beam 245K of light elements toward target structures 100K during plasmon oscillations (i.e., while EM radiation 211 at a suitable excitation frequency υ is being transmitted by EM radiation subsystem 210 to target structures 100K the manner described above). The functions of beam 245K include one or both of (a) implanting (adding) light elements into the integral bodies of target structures 100K that later undergo fusion reaction with other light elements disposed in target structure 100K in the manner described above, and (b) providing energetic light element ions that undergo direct fusion reaction with light elements already disposed in target structure 100K. By way of the simplified example depicted in the exemplary cutaway section located in the upper portion of FIG. 13, energetic light element particle 245K-1 is propelled in beam 245K with kinetic energy $KE_{245K1}$ into a localized region 105K of a target structure 100K-1. In one instance, light element particle 245K-1 becomes implanted in localized region 105K to form implanted light element 107K-1 during a first time period, and then interacts with an adjacent light element 107K-2 that is also disposed in localized region 105K during a second time period (i.e., when a phase of EM radiation 211 produces an electron cloud 109K in localized region 105K that generates enhanced electron screening effects SE sufficient to cause fusion of light element atoms 107K-1 and 107K-2). In a second instance, light element particle 245K-1 enters localized region 105K while electron cloud 109K is present, and a combination of kinetic energy $KE_{245K1}$ and enhanced electron screening effects SE cause fusion of light element particle 245K-1 and light element atom 107K-2. In one embodiment, light element ions generated by ion source 240K are first accelerated and then neutralized by adding electrons back into the ions before striking target structures 100K, whereby beam 245K may include either light element ions or (neutrally charged) light element particles.

Although the present invention has been described with respect to certain specific embodiments, it will be clear to those skilled in the art that the inventive features of the present invention are applicable to other embodiments as well, all of which are intended to fall within the scope of the present invention. For example, although the present invention is described with reference to solid (e.g., metal-based) target structures, it may be possible to achieve enhance electron screening effects around light element atoms that are transmitted or otherwise disposed in electrically conductive fluids that are configured to undergo plasmon oscillations of the type described herein. Although the present invention is described as a means to improve a scientific apparatus for measuring fusion cross sections, it may find utility for the development of improved neutron sources and if so this would fall within the scope of the invention, as would other applications enabled by what is described herein.

The invention claimed is:

1. A structure configured to enhance electron screening effects around light element atoms when subjected to applied electromagnetic (EM) radiation having an excitation frequency, said structure comprising an integral body comprising an electrically conductive material including said light element atoms and containing free electrons, wherein said integral body is configured such that free electrons in said conductive material undergo resonant plasmon oscillation when said excitation frequency of said applied EM radiation is in a range of $10^{12}$ Hz to $10^{16}$ Hz, whereby said free electrons move within said integral body in response to said applied EM radiation between at least two localized regions of said integral body such that said resonant plasmon oscillations generate periodic charge density variations around light element atoms disposed in said at least two localized regions.

2. The structure of claim 1, wherein said integral body comprises a nanostructure.

3. The structure of claim 2, wherein said integral body of said nanostructure comprises one of a spherical body, a rod-shaped body, a prism-shaped body, an octahedron-shaped body, a disc-shaped body, and a cube-shaped body.

4. The structure of claim 2, wherein said integral body of said nanostructure comprises a solid structure consists entirely of said electrically conductive material.

5. The structure of claim 2,
wherein said integral body of said nanostructure comprises an outer shell surrounding an inner core,
wherein said outer shell comprises said electrically conductive material, and
wherein said inner core comprises a second material that is different from the electrically conductive material.

6. The structure of claim 5, wherein said integral body comprises a heteroepitaxial structure.

7. The structure of claim 1, wherein said light element atoms comprise at least 10% of said electrically conductive material.

8. The structure of claim 1, wherein the electrically conductive material comprises one of a metal hydride, a metal deuteride, a metal tritide and a conductive light element material.

9. The structure of claim 8, wherein the electrically conductive material comprises at least one of a metal hydride and a metal deuteride selected from the group consisting of titanium hydride, titanium deuteride, zirconium hydride, zirconium deuteride, niobium hydride, niobium deuteride, vanadium hydride, vanadium deuteride, palladium hydride, palladium deuteride, and alloys thereof.

10. The structure of claim 8, wherein the electrically conductive material consists essentially of at least one of beryllium and lithium.

11. The structure of claim 1, wherein the electrically conductive material comprises one of a hydride, a deuteride and a tritide of a light element.

12. The structure of claim 1,
wherein said structure includes a plurality of said integral bodies,
wherein said structure further comprises a base fixedly connected to said plurality of integral bodies such that said plurality of integral bodies are maintained in a spaced-apart relationship, and
wherein said base comprises a second material having an electrical conductivity that is lower than that of said electrically conductive material.

13. The structure of claim 12,
wherein each of said plurality of said integral bodies comprises a nanostructure, and
wherein said base comprises a dielectric material.

14. The structure of claim 1, further comprising one or more of antenna structures fixedly disposed adjacent to said integral body.

15. The structure of claim 14, wherein said one or more of antenna structures comprise a first triangular-shaped metal structure and a second triangular-shaped metal structure respectively located on opposite sides of said integral body.

16. A nanostructure configured to enhance electron screening effects around light element atoms when subjected to applied electromagnetic (EM) radiation having an excitation frequency, said nanostructure comprising an integral body including an outer shell surrounding an inner core, said outer shell comprising an electrically conductive material including said light element atoms and containing free electrons and being configured such that free electrons in said conductive material undergo plasmon oscillation when said excitation frequency of said applied EM radiation is in a range of $10^{12}$ Hz to $10^{16}$ Hz, whereby said free electrons move within said outer shell in response to said applied EM radiation between at least two localized regions of said outer shell such that said plasmon oscillations generates periodic charge density variations around light element atoms disposed in said at least two localized regions.

17. The structure of claim 16, wherein said integral body comprises a heteroepitaxial structure.

18. The structure of claim 17, wherein said inner core comprises one of a dielectric solid material, a dielectric fluid and a vacuum.

19. A target structure configured to enhance electron screening effects around light element atoms when subjected to applied electromagnetic (EM) radiation having an excitation frequency, said target structure comprising:
an integral body comprising an electrically conductive material including said light element atoms and containing free electrons; and
one or more of antenna structures fixedly disposed adjacent to said integral body,
wherein said integral body and said one or more antenna structures are cooperatively configured such that free electrons in said conductive material undergo plasmon oscillations when said excitation frequency of said applied EM radiation is in a range of $10^{12}$ Hz to $10^{16}$ Hz, whereby said free electrons move within said integral body in response to said applied EM radiation between at least two localized regions of said integral body such that said plasmon oscillations generates periodic charge density variations around light element atoms disposed in said at least two localized regions.

20. The structure of claim 18, wherein said one or more of antenna structures comprise a first triangular-shaped metal structure and a second triangular-shaped metal structure respectively located on opposite sides of said integral body.

* * * * *